(No Model.)
J. P. B. FISKE.
MEANS FOR PROTECTING ELECTRIC MACHINES FROM HEAT.
No. 579,051. Patented Mar. 16, 1897.
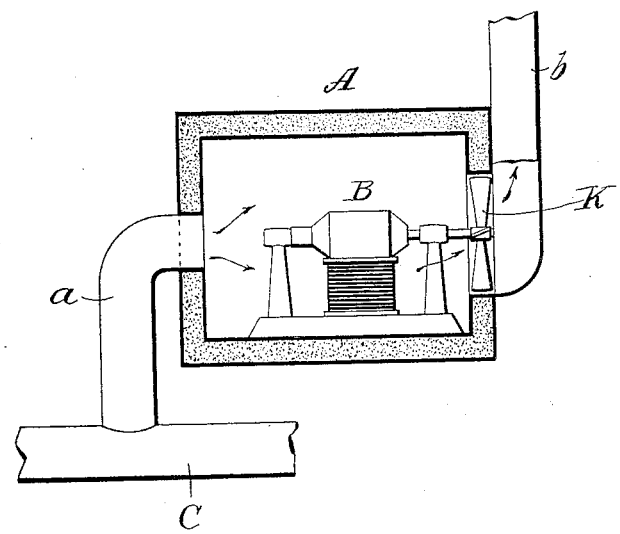
Witnesses
E. J. Nottingham.
G. F. Downing.
Inventor
J. P. B. Fiske
By H. A. Seymour
Attorney

United States Patent Office.

JONATHAN P. B. FISKE, OF ALLIANCE, OHIO.

MEANS FOR PROTECTING ELECTRIC MACHINES FROM HEAT.

SPECIFICATION forming part of Letters Patent No. 579,051, dated March 16, 1897.

Application filed January 12, 1895. Serial No. 534,691. (No model.)

*To all whom it may concern:*

Be it known that I, JONATHAN P. B. FISKE, a resident of Alliance, in the county of Stark and State of Ohio, have invented certain new and useful Improvements in Means for Protecting Electric Machines from Heat; and I do hereby declare the following to be a full, clear, and exact description of the invention, such as will enable others skilled in the art to which it appertains to make and use the same.

My invention relates to means for protecting electric machines from heat.

The use of electric motors for driving various kinds of machinery is becoming more and more general and is rapidly supplanting the steam-engine, one of the most promising fields for the electric motor being the steel-rolling mills. Two particular sources of difficulty which must be overcome in using an electric motor in such places are, first, the abnormal amount of heat to which the motor is subjected, and, second, dirt, grease, metallic dust, dripping of water, and other dangerous elements. If the electric motor is to be used on a very large scale, it will soon be necessary to place it in such a position that it will be exposed to an abnormal amount of heat, which would soon cause the destruction of the machine. Where temperatures ranging from 150° to 200° are not infrequent, the insulation of the machine would soon become ruined.

The object of my invention is to produce means by which the external heat and also foreign matter will be effectually excluded from an electric machine and at the same time the internal heat, or heat created by the machine itself, can be dissipated.

A further object is to render it possible to use an electric motor in a machine-shop and in places where the temperature rises to a high degree without danger to the motor, either from the excessive heat in the apartment where it is situated or from dirt, metallic dust, &c.

A further object is to produce cooling apparatus for electric machines which shall be simple in construction, cheap to manufacture, and which shall be effectual in the accomplishment of the duties required of it.

With these objects in view the invention consists in certain novel features of construction and combinations and arrangements of parts, as hereinafter set forth, and pointed out in the claim.

The accompanying drawing is a view illustrating my invention.

A represents a casing or housing of a size sufficient to receive an electric motor B and an attendant when the services of the latter are necessary to inspect or repair the motor. The walls of the casing or housing are lined or filled with heat-resisting material, so that all external heat will be excluded from the motor, the latter being surrounded by said heat-resisting casing or housing.

A cold-air duct C is disposed below the casing or housing A and communicates by a pipe $a$ with one end of the casing or housing. An upwardly-projecting pipe or stack $b$ communicates with the other end of the casing or housing. From this construction and arrangement of parts it will be seen that all external heat and foreign matter will be excluded from the motor by the non-conducting walls of the housing and that the heat created within the housing by the motor itself will be dissipated by the current of cold air entering said housing through the pipe $a$, the heated air passing out through the stack $b$. The pipes will preferably be so connected with the casing or housing that the cold air will enter the same at the commutator end of the motor.

In order to create a proper draft through the housing, a fan $k$ is secured to the armature-shaft and disposed within one of the openings in the housing.

Various other modifications might be resorted to without departing from the spirit of my invention or limiting its scope, and hence I do not wish to limit myself to the precise details of construction herein set forth; but, Having fully described my invention, what I claim as new, and desire to secure by Letters Patent, is—

The combination with an electric machine and a housing inclosing the same, the latter having openings in the ends, of a fan located in one of said openings, said fan being carried by the armature-shaft of said electric machine, substantially as set forth.

In testimony whereof I have signed this specification in the presence of two subscribing witnesses.

JONATHAN P. B. FISKE.

Witnesses:
 W. C. LLOYD,
 GEO. A. ESTERLY.